US011855462B2

United States Patent
Egenter et al.

(10) Patent No.: US 11,855,462 B2
(45) Date of Patent: Dec. 26, 2023

(54) METHOD FOR CONTROLLING AN INDUCTION COIL, AND INDUCTION COIL APPARATUS

(71) Applicant: E.G.O. Elektro-Geraetebau GmbH, Oberderdingen (DE)

(72) Inventors: Christian Egenter, Bretten (DE); Robin Goebel, Ubstadt-Weiher (DE); Elmar Herweg, Oberderdingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 808 days.

(21) Appl. No.: 16/802,639

(22) Filed: Feb. 27, 2020

(65) Prior Publication Data

US 2020/0287421 A1    Sep. 10, 2020

(30) Foreign Application Priority Data

Mar. 5, 2019 (DE) ..................... 10 2019 202 991.4

(51) Int. Cl.
*H02J 50/12* (2016.01)
*A47J 43/046* (2006.01)
(Continued)

(52) U.S. Cl.
CPC ........... *H02J 50/12* (2016.02); *A47J 43/0465* (2013.01); *H02J 50/10* (2016.02); *H02P 13/00* (2013.01)

(58) Field of Classification Search
CPC ........ H02J 50/12; H02J 50/10; A47J 43/0465; H02P 13/00; Y02B 40/00; H05B 6/062;
(Continued)

(56) References Cited

U.S. PATENT DOCUMENTS 4,356,371 A    10/1982  Panasonic
9,083,204 B2 *  7/2015  Azancot .................. H01F 38/14
(Continued)

FOREIGN PATENT DOCUMENTS

DE          3042525 C2    3/1985
DE      102017114951 A1   1/2019
(Continued)

OTHER PUBLICATIONS

European Patent Office, Extended European Search Report received for Application No. 20160439.4, dated Jul. 20, 2020, 14 pages, Germany.
(Continued)

*Primary Examiner* — Jared Fureman
*Assistant Examiner* — Michael J Warmflash
(74) *Attorney, Agent, or Firm* — Alston & Bird LLP

(57) ABSTRACT

A method for controlling an induction coil on an induction hob involves a power generation for a primary power on the induction coil for power transmission to an electrical consumer put onto a cover above the induction coil, which consumer has a receiver coil and an electrical load connected thereto, being adjusted. The induction coil forms a primary-side resonant circuit with a capacitance connected in series, and the induction coil and the receiver coil are coupled in the style of a transformer such that a current in the induction coil induces a voltage in the receiver coil with a flow of current and generation of the secondary power in the load of the electrical consumer. The control means can attempt to adjust the desired secondary power to a steady state using maximum modulation of the voltage effectively applied to the primary-side resonant circuit, as second manipulated variable. The primary power is decreased in a first step by virtue of the voltage effectively applied to the primary-side resonant circuit, as second manipulated vari- (Continued)

able, being decreased before the operating frequency as first manipulated variable is increased in a second, subsequent step.

16 Claims, 5 Drawing Sheets

(51) Int. Cl.
*H02P 13/00* (2006.01)
*H02J 50/10* (2016.01)

(58) Field of Classification Search
CPC .......... H05B 6/1236; H05B 6/06; H05B 6/36; H05B 6/04; H05B 6/1209
See application file for complete search history.

(56) References Cited

U.S. PATENT DOCUMENTS

| | | | |
|---|---|---|---|
| 2007/0221668 A1 | 9/2007 | Baarman et al. | |
| 2012/0261405 A1* | 10/2012 | Kurose | H05B 6/44 |
| | | | 219/620 |
| 2014/0125147 A1* | 5/2014 | Azancot | H02J 50/12 |
| | | | 307/104 |
| 2014/0158680 A1* | 6/2014 | Kitaizumi | H05B 6/062 |
| | | | 219/665 |
| 2015/0013549 A1* | 1/2015 | Yaman | H05B 6/1236 |
| | | | 99/358 |

FOREIGN PATENT DOCUMENTS

| | | |
|---|---|---|
| EP | 2112861 A1 | 10/2009 |
| EP | 2512205 B1 | 2/2015 |
| EP | 2798910 B1 | 6/2017 |
| JP | 2015-076145 A | 4/2015 |
| JP | 2016-134355 A | 7/2016 |

OTHER PUBLICATIONS

German Patent and Trade Mark Office, Office Action received for Application No. 102019202991.4, dated Jul. 7, 2020, 8 pages, Germany.

* cited by examiner

METHOD FOR CONTROLLING AN INDUCTION COIL, AND INDUCTION COIL APPARATUS

CROSS-REFERENCE TO RELATED APPLICATIONS

This application claims priority to German Application No. 10 2019 202 991.4, filed Mar. 5, 2019, the contents of which are hereby incorporated herein in its entirety by reference.

FIELD OF APPLICATION AND PRIOR ART

The invention relates to a method for controlling an induction coil, in particular on an induction hob, in order to be able to adjust a power generation for a primary power on the induction coil. The induction hob has control means for the power generation, wherein the induction coil forms a primary-side resonant circuit with a capacitance connected in series. The control means of the induction coil have at least two manipulated variables by means of which they alter the generated primary power, namely the altering of an operating frequency for the primary-side resonant circuit as a first manipulated variable and the altering of a voltage effectively applied to the primary-side resonant circuit as a second manipulated variable.

The induction coil in this arrangement can perform a power transmission to an electrical consumer put onto a cover above the induction coil, which electrical consumer has a receiver coil and an electrical load connected thereto. The induction coil and the receiver coil are then coupled in the style of a transformer such that a current in the induction coil induces a voltage in the receiver coil, which in turn causes a flow of current, as a result of which a secondary power is generated in the load of the electrical consumer. Information pertaining to a desired secondary power on the load of the electrical consumer is prescribed for the control means of the induction coil, for example by means of a setting knob at the top of the electrical consumer.

In market studies from approximately the last 10 years, thoughts have turned to solutions for cordless appliances that, as it were, can simply be put on a dining table or onto a kitchen worktop, in particular an induction hob, and operated. The absence of a connecting cable provides the user with greatly increased flexibility because the same space can be used both for preparing and for cooking food and also for operating a wide variety of, electrical, kitchen aids or appliances, as well as for free use over and above food preparation. This advantage is anticipated for very small flats with small kitchens or kitchen units, above all.

Work is being carried out on an open standard for the inductive supply of power to kitchen appliances that provides not only for the above application in the table but also for a supply of energy on special induction hobs by the induction coil thereof, it then being possible to operate both conventional cookware and cordless kitchen appliances on said hobs. These cordless kitchen appliances are fundamentally provided not only with a receiver coil but also with control intelligence, since their control elements are located in the appliance, and these can then be used to request the power via a radio connection or the like. An advantage of an integrated radio connection is that the cordless kitchen appliance registers with the hotplate via radio and is identified before the power generation therefor can be started. In the case of an application on a normal table top, power generation can thus start only after prior identification, since conventional cooking pots must under no circumstances be heated there owing to the heat generation on the underside thereof, and only suitable cordless appliances are permitted to be operated.

When an induction hob is used to accommodate the induction coil and its control means therein, the same induction coil each time is supposed to be able to be used both to heat an induction-compatible cooking pot and to supply a cordless appliance as electrical consumer with power or energy. In both cases, the induction coil and the cooking pot or the receiver coil are coupled in the style of a transformer, i.e. a current in the induction coil induces a voltage in the receiver coil, which leads to a flow of current there in accordance with a secondary power in the load of the electrical consumer, which in turn leads to a counter voltage in the induction coil.

Problems stem from load changes or sudden load changes on the electrical consumer, that is to say for example if the latter is switched off abruptly or moved in relation to the induction coil, for example by a few cm or else removed completely.

Object and Solution

The invention is based on the object of providing a method as cited at the outset and an induction coil apparatus suitable for performing said method that allow problems in the prior art to be solved and that in particular allow an electrical consumer put on above the induction coil and having a receiver coil and an electrical load connected thereto to be operated advantageously, preferably even in the event of an abrupt load change or very rapid movement of the electrical consumer.

This object is achieved by a method having the features of Claim 1 or Claim 9 and by an induction coil apparatus having the features of Claim 16. Advantageous and preferred refinements of the invention are the subject of the further claims and are explained in more detail below. Some of the features in this case are described just for the method or just for the induction coil apparatus. Regardless of this, they are supposed to be able to apply both to the method and to such an induction coil apparatus on their own and independently of one another, however. The wording of the claims is made the content of the description by express reference.

There is provision for the induction coil to be designed for power transmission to an electrical consumer put onto a cover above the induction coil, which electrical consumer has a receiver coil and an electrical load connected thereto, as described at the outset. The applicable induction coil apparatus is advantageously in the form of an induction hob, that is to say one on which cooking is also supposed to be able to take place. It may fundamentally also be incorporated or integrated in any suitable furniture such as a table, a cupboard or a dresser, however.

There is provision for control means for the power generation, advantageously with power switches, for example power semiconductor switches. The induction coil forms a primary-side resonant circuit with a capacitance connected in series, as is customary. The primary resonant circuit can advantageously be supplied with power by a half-bridge or a full bridge. During operation, the induction coil and the receiver coil are coupled in the style of a transformer such that a current in the induction coil induces a voltage in the receiver coil on the basis of the generated primary power. This voltage in turn causes a flow of current and hence a generation of the secondary power in the load of the electrical consumer, which in turn leads to a counter voltage in the induction coil. Here, there is advantageously also provision for a controller of the induction coil, said controller being designed to perform the aforementioned method. It may in particular be connected to the control means or can provide said control means with information.

Information pertaining to a desired secondary power on the load of the electrical consumer is prescribed for the control means of the induction coil, wherein the control means of the induction coil have at least two manipulated variables. They can alter the generated primary power by means of these two manipulated variables. A first manipulated variable is the altering of an operating frequency for the primary-side resonant circuit. A second manipulated variable is the altering of a voltage effectively applied to the primary-side resonant circuit. The control means operate with a transfer function P(f) for the primary power that has at least one local peak, sometimes even just a single peak, around which an operating method proceeds advantageously. The reason is that if the coupling is good, the transfer function can have two peaks with a trough in between. From the aforementioned at least one local peak, the function or the curve thereof flattens out on both sides. In the case of this transfer function P(f), a decrease in the operating frequency to the right of this at least one local peak leads to a higher primary power, and an increase in the operating frequency leads to a lower primary power. The range being used is then what is known as the inductive operating range. To the left of this at least one local peak, a decrease in the operating frequency leads to a lower primary power, and an increase in the operating frequency leads to a higher primary power. The range being used is then what is known as the capacitive operating range. Preferably, the induction coil is operated using an operating frequency that is above the operating frequency at this local peak in the transfer function, which means that the induction coil is in the inductive operating range. A first derivative of the transfer function is negative here, since it falls here. The local peak is advantageously in a range of the operating frequency between 15 kHz and 50 kHz, particularly advantageously between 20 kHz and 36 kHz, and in this range it is the only peak in the transfer function P(f) for the primary power.

Moving the pot at constant operating frequency alters the coupling between the induction coil and the receiver coil and can result in the preferred inductive operating range of the transfer function no longer being used, rather the capacitive operating range. An attempt can then be made to steer back to the preferred inductive operating range.

According to the invention, the control means in a first mode of operation always attempt to adjust the desired secondary power to a steady state using maximum modulation of the voltage effectively applied to the primary-side resonant circuit, which voltage forms the aforementioned second manipulated variable. This applies in the following cases:
  in the event of a change in the desired secondary power or
  in the event of a difference between a measured secondary power and the desired secondary power. This can be caused by a change in the transformer-style coupling between the induction coil and the receiver coil and/or by a change in the electrical load, which can be brought about by integrated switching means in the electrical consumer.

The primary power is increased, in particular because a higher secondary power is demanded in accordance with one of the two aforementioned cases, by virtue of the control means decreasing the operating frequency as first manipulated variable.

The primary power is decreased, in particular because a lower secondary power is demanded in accordance with one of the two aforementioned cases, by virtue of the control means decreasing the voltage effectively applied to the primary-side resonant circuit, as second manipulated variable, in a first step. In a second, subsequent step, the operating frequency as first manipulated variable is then increased. If need be, the two steps need to be repeated multiple times in order to keep the current and the power in a desired operating range. As such, an operating point on a curve of a transfer function P(f) can again be attained, just on a different curve, as corresponds to the new physical conditions. In particular a change in the transformer-style coupling between the induction coil and the receiver coil on account of a movement clearly results in a new curve.

Advantageously, the induction coil and the receiver coil are "interoperable" or matched to one another, as is the aim of the aforementioned open standard. This means that the induction coil and the receiver coil have their diameter and inductance matched to one another, in regard to the performance class, for the preferred application in an induction hob or installation in a piece of furniture, for example a table or a dresser. As such, the respectively defined powers can be transmitted during the power transmission.

In one refinement of the method, if the electrical consumer is moved relative to the induction coil and, as a result, the transformer-style coupling becomes lower and the primary-side resonant circuit is damped in a short time, preferably in less than 0.5 sec or even in less than 0.2 sec, the control means can keep the primary-side current approximately constant at an initial level of the primary-side current of $I\_1$ before the electrical consumer was moved, with a range of variation of $\pm 5\%$, at constant operating frequency in a first step. This is accomplished by virtue of the control means reducing the voltage effectively applied to the primary-side resonant circuit, as second manipulated variable. As such, a primary power is generated that corresponds to a secondary power lower than the desired secondary power. The resultant operating point is robust against the various possible causes of damping, in particular if a change towards said operating point is such that the resulting operating point should lie in the aforementioned capacitive operating range of the transfer function, in which a reduction in the frequency leads to a rise in the current that can even destroy a converter. A disadvantage of this first step is that the resultant operating point normally has increased losses. At a higher operating frequency with maximum effective voltage on the induction coil, the losses would be lower, i.e. the efficiency would be higher. The aim in subsequent steps is thus to change to such an operating point having lower losses.

In a second step, the operating frequency as first manipulated variable is increased until the current in the induction coil has changed by no more than $\pm 10\%$ or until the primary power differs from the value for the primary power at which the actual secondary power corresponds to the desired secondary power by no more than $\pm 10\%$. Measuring the secondary power in order to see whether the desired secondary power that the electrical consumer has requested from the induction coil is present on the load would take too long for the control process, that is to say makes no technical sense. Subsequently, the voltage effectively applied to the primary-side resonant circuit, as second manipulated variable, is altered again such that the primary-side current has again reached its initial level of I_1 before the electrical consumer was moved or the desired secondary power was changed, or a change of load, or until the desired secondary power on the load has been obtained.

The first aforementioned step and the second aforementioned step are then performed alternately until the secondary power measured on the load is less than or equal to the desired secondary power, or until the maximum possible voltage effectively applied to the primary-side resonant circuit, as second manipulated variable, is reached. In the latter case, it may just not be possible for a higher secondary power to be caused; the load then needs to be operated at lower secondary power.

In one advantageous refinement of the invention, in the aforementioned second step, when the operating frequency as first manipulated variable is increased, the threshold for a change in the current in the induction coil and/or the threshold for a change in the primary power upward, that is to say as an increase, is lower than for a change downward, that is to say as a decrease. As such, this may preferably be by no more than +5% upward and by no more than −10% downward, particularly preferably by no more than +2% upward and by no more than −5% downward. There is thus a greater possibility of a decrease than an increase, which clearly helps to protect the circuit components.

Information pertaining to a desired secondary power on the load of the electrical consumer is advantageously prescribed for the control means; particularly advantageously, the electrical consumer sends the prescribed value for the power generation to the power generation. To this end, said electrical consumer can have not only a transmitter and a control or a certain intelligence but also a control unit that a user can use to adjust the operation of the electrical consumer and hence the load. As such, the electrical consumer can be a mixer, for example, that can operate at different speed levels. There is therefore a varying power requirement on an electric motor of the mixer, depending on which level the user sets on the control unit, for example by means of a button or rotary switch. This selected speed level is evaluated by the control, which calculates therefrom a desired secondary power that the motor and the electrical consumer need, possibly in addition to a power for the basic requirement of the control unit. This desired secondary power is then sent by the electrical consumer to the control means of the induction coil, for example in an induction hob having an appropriate receiver.

The desired secondary power may firstly be an absolute value, for example "1500 W". As such, an electrical consumer is able, without integrated measurement of the secondary power, to prescribe a desired power corresponding to the desired operating point on the basis of experience. If the electrical consumer does not have a device for measuring the secondary power on the load, the receiver, on the other hand, can send a difference in the measured secondary power from the desired secondary power to the control means of the induction coil, since the primary power and the secondary power differ from one another by the losses during the transmission, this efficiency being able to vary. The induction coil can provide control only against values of its own, which means that the prescribing of the secondary power is used to ascertain a desired primary power. This primary power is then used to operate the induction coil.

The voltage effectively applied to the primary-side resonant circuit, as second manipulated variable, is preferably altered by changing the ratio of the ON period to the OFF period of the switching means for a half-bridge in the power control, which is also known as duty ratio. If there is provision for a full bridge, collectively formed from two half-bridges, in the power control, the phase angle between the controlling signals of the two half-bridges is changed, which ultimately corresponds to what has been described above and to the altering of the effectively applied voltage.

An advantageous duty ratio of 50% in the case of a DC-controlled half-bridge corresponds to the operating point at the maximum of the effective voltage for a prescribed operating frequency. However, there are in fact alternative control methods, the duty ratio of 50% corresponding to a phase angle of 180° in the case of a full bridge. When the duty ratio is reduced, the operating frequency preferably remains constant.

Advantageously, the power transmission can be permanently effected at the maximum possible voltage effectively applied to the primary-side resonant circuit, as second manipulated variable. An effective voltage of maximum magnitude is applied to the induction coil at the arising operating frequency.

There can be provision for the changing of the operating frequency, in particular to change the primary power, to be stopped each time as soon as a resulting change in the primary power reaches a threshold of ±10%. The aforementioned threshold values that are preferably lower upward than downward can apply in this case. They can also be +5% and −10%, in particular +2% and −5%.

Preferably, permanent operation of the induction coil to supply power to the electrical consumer can be effected at an operating frequency that is higher than an operating frequency at which the curve of the transfer function P(f) has its aforementioned at least local peak in the maximum primary power, or in which the curve of the transfer function P(f) has a negative first derivative, that is to say falls. As mentioned previously, the range being used is then the inductive range of the transfer function P(f). The losses can be kept lower here.

In a method according to the preamble of Claim 1, dynamic limiting of the current through the induction coil is effected to protect the apparatus, but also the electrical consumer, wherein a limit is +10%, in particular +5%, of the present current value. The dynamic limiting limits the current and hence the magnetic field, which, as a current source in the load, can damage or even destroy the latter. To protect the primary-side apparatus, it is sufficient to limit the current there to an absolute value at which said apparatus is certainly not destroyed. This limit cannot be exceeded for a period of more than 1 sec, preferably more than 0.1 sec or even just more than 0.02 sec. Otherwise, the power generation on the induction coil is switched off or the current is reduced to a value at least 25% or even 50% below the present current value, the current being reduced by virtue of the voltage effectively applied to the primary-side resonant circuit, as second manipulated variable, being reduced.

The aforementioned limit can be regularly corrected, preferably every 8 msec to 500 msec. In particular, it is corrected every 16.6 msec to 20 msec, so that every second half-cycle can be checked. This can be used for transition processes between operating points to continually have protection against sudden load changes, in particular shed loads, in the electrical consumer that has been put on.

Advantageously, the current through the induction coil can be measured by means of comparators that directly influence a driver for power semiconductors as control means for the induction coil. This achieves a configuration that has as little susceptibility to error as possible.

In one refinement of the invention, a power generation with a half-bridge circuit for the induction coil can involve a current peak being measured as current, which current peak is generated by precisely one power switch of the half-bridge circuit. This power switch has the shorter ON time in comparison with the other power switch.

Preferably, multiple induction coils in an induction hob as a possible induction coil apparatus are controlled using this method, particularly preferably in a specific mode for electrical consumers having an electrical load that have been put on. These induction coils can then still be used for standard inductive heating of pots in another normal mode. An operating frequency to increase the primary power of one of the induction coils is not reduced continuously in this case, but rather is reduced in steps or stages. Preferably, the change in the operating frequency of an induction coil is synchronized together with those of other induction coils that are currently being operated.

The present invention particularly relates, in a first case, to handling a change in the desired secondary power of an electrical consumer that has been put on, in particular also in the case of a sharp change in the power requirement. Similarly, it deals with a change in the transformer-style coupling between the induction coil and the receiver coil, for example in the event of movement. The transformer-style or magnetic coupling between the induction coil and the receiver coil becomes lower if the receiver coil is not placed centrally above the induction coil. Even when the receiver coil is moved, it is admittedly possible to transmit the maximum envisaged power provided that the permissible currents and voltages are not exceeded in the induction coil and the receiver coil. When the coupling decreases, more current is usually needed in the induction coil to transit or induce the same secondary power, the current and power being particularly highly dependent on the operating frequency f of the induction coil, however, since the impedance of the whole arrangement also changes sharply with the frequency. If a receiver coil is moved down from the induction coil, as a result of which the coupling becomes lower, then the point at which the maximum power is transmitted shifts to a higher operating frequency. This point of maximum power transmission corresponds to a resonant point with at least a local minimum of the impedance. The lower impedance for constant operating frequency increases the current I in the induction coil and the voltage U_load in the reception coil. If the operating frequency is then increased by the power generation for the induction coil, there is the risk of the current in the induction coil and the voltage in the reception coil rising if the power generation cannot increase the operating frequency faster than the coupling becomes lower or than the electrical consumer is moved. If this results in limits being exceeded in the receiver coil and in the induction coil, this can lead to damage or even failure of the induction coil and/or the receiver coil, or of the respective control thereof. This risk is particularly great if the operating point changes over, as a result of the lower coupling, from the aforementioned preferred inductive range of the transfer function, in which an increase in the frequency leads to higher impedance, i.e. the current and the voltage are reduced as a result, to a capacitive range of the transfer function, in which an increase in the frequency leads to lower impedance, i.e. the current and the voltage increase with the frequency rise. It is thus disadvantageous if the operating frequency is increased in order to limit the current in the induction coil or the voltage in the receiver coil.

Advantageously, a power generation for the induction coil with a half-bridge involves the duty ratio or duty cycle being reduced in accordance with an ON ratio of the power switch with the shorter ON time in relation to a whole cycle period, or a power generation for the induction coil with a full bridge involves the phase angle between a control of the two bridges being reduced. On the other hand, an operating point at maximum duty ratio or duty cycle of close to 50% or operation at 180° phase angle causes the lowest losses in a converter of the power generation, so that frequency control leads to higher efficiency.

In a second case, the present invention particularly involves the handling of a further, specific risk, namely when the electrical consumer has means that can isolate its load from the receiver coil, since the electrical consumer could be destroyed if it is put onto a conventional induction cooking area whose pot detection cannot distinguish the electrical consumer from an ordinary induction-compatible pot. These means are advantageously relays. Owing to the lack of communication from the electrical consumer to the conventional induction cooking area, that is to say in this case to the induction hob, the latter can exceed the permissible limits of the electrical consumer during operation of the applicable induction coil and can damage or even destroy said electrical consumer, possibly even cause a fire. It is also conceivable for an electrical consumer to have multiple loads, for example one or more individually disconnectable heating resistors and motor-based loads such as fans or stirrers. These need to be able to be operated individually.

Normally, a communication device integrated in the system should be used, advantageously by means of radio, by the electrical consumer to first prompt the induction coil to switch off the transmitted power or at least to reduce it to a noncritical level for the electrical consumer before it isolates or disconnects a load. If a sudden load change occurs in the course of operation, the impedance changes suddenly, which in most cases leads to a sudden rise in the current in the induction coil and consequently also in the voltage U_load in the receiver coil. The induction coil can protect itself by limiting the current to its maximum permissible value before destruction, provided that there is provision for sufficiently fast detection of the sudden load change and for a reducing device. Advantageously, this can be accomplished by virtue of the induction coil reducing the duty cycle in the DC controller, or the phase angle. So long as a current flows in the induction coil on the primary side, said current acts as a current source for the electrical consumer, i.e. even if the heating circuits have supposedly been switched off, current will flow in the electrical consumer for as long as it finds some path, in which case it can damage the electrical consumer.

It is possible to begin operation of the induction coil preferably at the highest possible operating frequency of a converter in the power generation, since a higher impedance can usually be expected there, which can have a current-limiting effect. Since electrical consumers such as an aforementioned mixer or else a toaster, kitchen machines or the like have resonant circuits both on the primary side and on the secondary side, it is particularly possible for two local resonant points to arise in the case of highly coupled systems. One of said resonant points can also be at the highest operating frequency of the converter. Operation of the induction coil should thus always be started with the lowest possible duty cycle or phase angle.

If lower powers, from a relative point of view, of for example 2 W to 200 W are supposed to be transmitted to the electrical consumer, for example if only the control unit of said electrical consumer or switching means for heating circuits in the electrical consumer are supposed to be switched on and operated, then that is usually less power than can be transmitted at the highest operating frequency and with the lowest permissible duty cycle or duty ratio for a half-bridge in the power generation. The phase angle for a full bridge in the power generation can theoretically be reduced almost to zero, which means that it is also possible for extremely low powers to be realized. The standard method of induction hobs using the ON time of mains half-cycles in a short cycle of usually 1 to 10 sec is then unsuited to power transmission in this instance because this can lead both to gaps in the supply of power to the electrical consumer and to inadmissible peaks in the electrical consumer already. This operating situation is thus realized, as one option, by gating each mains half-cycle, preferably symmetrically in the rising and falling portions of the mains half-cycle. Phase gating is permitted in this case because the maximum short-term power already has a highly power-limiting effect owing to a suitable choice of high operating frequency and low duty ratio. Alternatively, the HF control can be operated in the pulse frequency mode, in which the HF ON time is kept constant at the lowest permitted value in accordance with a pulse from one or both switches of the half-bridge. This is consistent with a minimum duty ratio at the highest operating frequency. At the same time, the operating frequency is then reduced, i.e. the oscillation is performed more rarely. A comparable result can be obtained if a pot detection pulse, customary in induction hobs, is activated at a suitable frequency. If this involves the power being gated using one of the described methods, then the resulting gaps need to be rated when calculating the effective power and removed in order to prevent large tolerances in the power regulation.

These and further features emerge not only from the claims but also from the description and the drawings, the individual features each being realized on their own or in multiples in the form of subcombinations for an embodiment of the invention and in other fields and being able to represent advantageous embodiments that are eligible for protection on their own and for which protection is claimed here. The division of the application into intermediate headers and individual sections does not limit the generality of the statements made under said intermediate headers.

BRIEF DESCRIPTION OF THE DRAWINGS

Exemplary embodiments of the invention are depicted schematically in the drawings and are explained in more detail below. In the drawings.

DETAILED DESCRIPTION OF THE EXEMPLARY EMBODIMENTS

Figure 1:
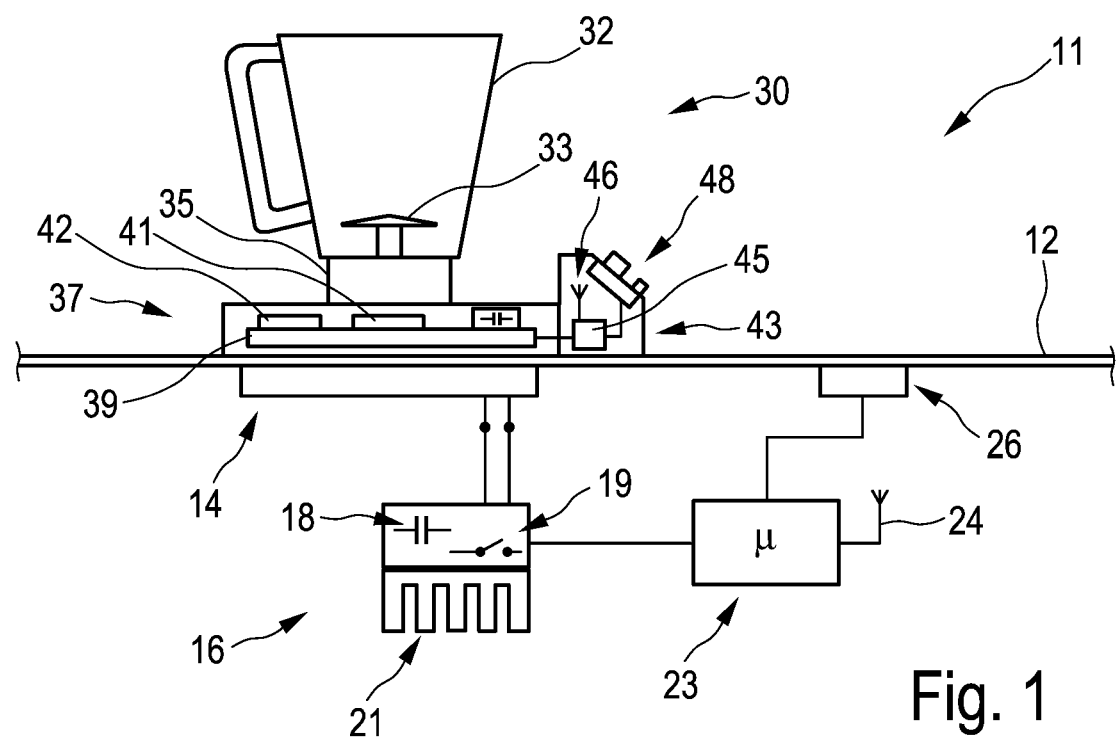
FIG. 1 shows a schematic depiction of an induction coil apparatus according to the invention with a mixer that has been put on, as electrical consumer.

FIG. 1 depicts an induction coil apparatus according to the invention as induction hob 11, with a hob top 12 and an induction coil 14 on the underside thereof. For the induction coil 14, there is provision for an inherently standard power generation 16, as are also installed in normal induction hobs in accordance with the prior art, namely having a converter. The power generation 16 has a first primary-side resonant circuit capacitance 18 and power switches 19, which can be in the form of a half-bridge or in the form of a full-bridge. There is also provision for a heat sink 21. The power generation 16 can supply power to or control multiple induction coils of the induction hob 11, said induction coils not being depicted here.

A controller 23 of the induction hob 11 controls the power generation 16. Said controller has an antenna 24 in order to obtain and also possibly send information by radio. The controller 23 is connected to a display control unit 26, which can also be of standard design. Said display control unit advantageously has display elements, preferably as LEDs, and control elements, preferably as touch switches. There can also be provision for a combination as touchscreen. This can be used to control the induction hob with its conventional functions as usual. In addition, it can also be used to apply part of the invention.

An electrical consumer 30 as a mixer has been put onto the hob top 12 above the induction coil 14. The mixer has a mixer receptacle 32 with a mixer blade 33 therein, and an electric motor 35 for driving said blade. A housing 37 contains the important unit for the supply of power, namely a receiver coil 39 along with switching means 41 therefor. The receiver coil 39 is coupled to the induction coil 14 in the style of a transformer as explained at the outset, this being clearly discernible and imaginable here. A current, corresponding to the generated primary power, in the induction coil 14 induces a voltage in the receiver coil 39 in the style of a transformer, said voltage causing a flow of current and hence a generation of the secondary power in the load of the electrical consumer 30, namely in the electric motor 35. The switching means 41 are advantageously in the form of a fuse or the like, rather than as classical switches for controlling the electric motor 35. This is effected by means of control of the supply of power by the induction coil 14. A fuse is provided only for emergencies, for example in accordance with a fusible link. There is also provision for a power measurement 42, which can record precisely how much power arrives at the receiver coil 39 or alternatively at the electric motor 35. The power measurement 42 is designed as known from the prior art.

The right-hand side of the housing 39 is provided with a control 43 that has a controller 45 along with an antenna 46 and control elements 48, advantageously also a display for a user. The controller 45 and the controller 23 can communicate or exchange information with one another by means of the antennas 46 and 24; in particular, the controller 45 can send the controller 23 a desired power as desired secondary power, which a user has input using the control elements 48.

In the method according to the invention, a user can input for example a power level 3 as high power for the mixer by means of the control elements 48, this being deemed to be a desired secondary power and accordingly being sent to the controller 23. To this end, there can generally be provision in the control 43 for a power supply in the form of a storage battery. The controller 23 then uses the power generation 16 to convert the desired secondary power into a primary power to be generated, for example on the basis of empirical values or by calculation. The induction coil 14 is thus operated with a specific primary power that should per se lead to the desired secondary power, at least approximately, and transmits power to the receiver coil 39 in the style of a transformer. This transmitted power is used to operate the control 43 and above all mainly to operate the drive motor 35 in order to drive the mixer. The received secondary power is measured by means of the power measurement 42, and if it does not yet correspond to the desired secondary power according to the selected power level 3, because it is too low, the controller 45 sends information to the controller 23 indicating that more primary power needs to be generated. The magnetic coupling between the induction coil 14 and the receiver coil 39 that was cited at the outset can also be significant here, since it impairs the power transmission if it is less than optimum, above all because the induction coil 14 and the receiver coil 39 are not exactly concentric or the like.

On the basis of the information sent from the electrical consumer 30, the controller uses the power generation 16 to change the generated primary power until the information that the actual secondary power corresponds to the desired secondary power arrives. This primary power then continues to be generated, and the electrical consumer or the mixer 30 uses it.

Figure 2:
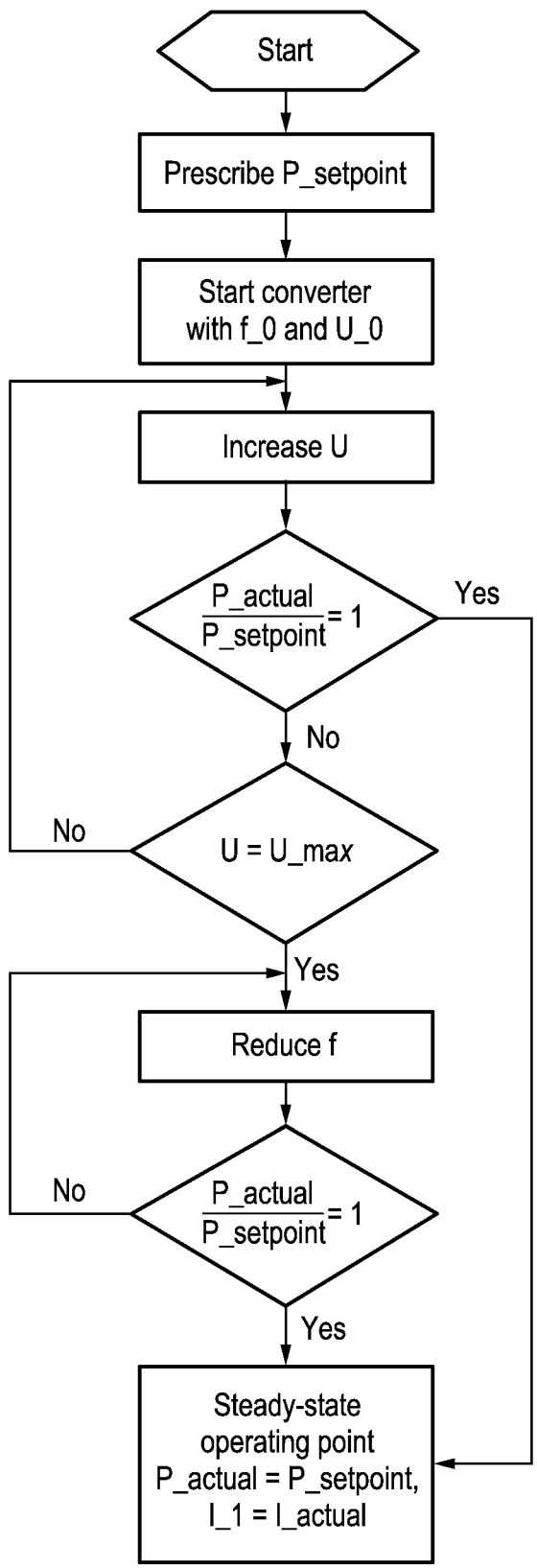
FIGS. 2 to 4 show various flowcharts for a power generation for the induction coil.

This first adjustment when the electrical consumer 30 is started is depicted in the flowchart in FIG. 2. In this case, P_setpoint corresponds to the desired secondary power that is supposed to be available at the mixer during continuous operation. The power generation 16 with the converter starts at an initial frequency f_0 and an initial voltage U_0 effectively applied to the primary circuit of the induction coil 14. These are advantageously chosen such that the actual secondary power is very probably below the desired secondary power P_setpoint. The voltage U for the induction coil 14 is then increased in order to increase the primary power. A measurement is then taken to determine whether the resultant measured secondary power P_actual already corresponds to the desired secondary power P_setpoint. If this is the case, then the steady-state or permanent operating point is already reached. If this is not yet the case, then a check is performed to determine whether the applied voltage U corresponds to a maximum permissible voltage U_max. If this is not yet the case, then the voltage U is increased once again with the pass as explained above. As soon as the maximum permissible voltage U_max has been reached, but not yet the desired secondary power P_setpoint, the operating frequency f is reduced.

If a first reduction of the operating frequency f is able to achieve the effect that the measured secondary power P_actual corresponds to the desired secondary power P_setpoint, then the aforementioned steady-state operating point has again been reached. If this is not yet the case, the operating frequency is reduced until the desired condition is reached.

Figure 3:
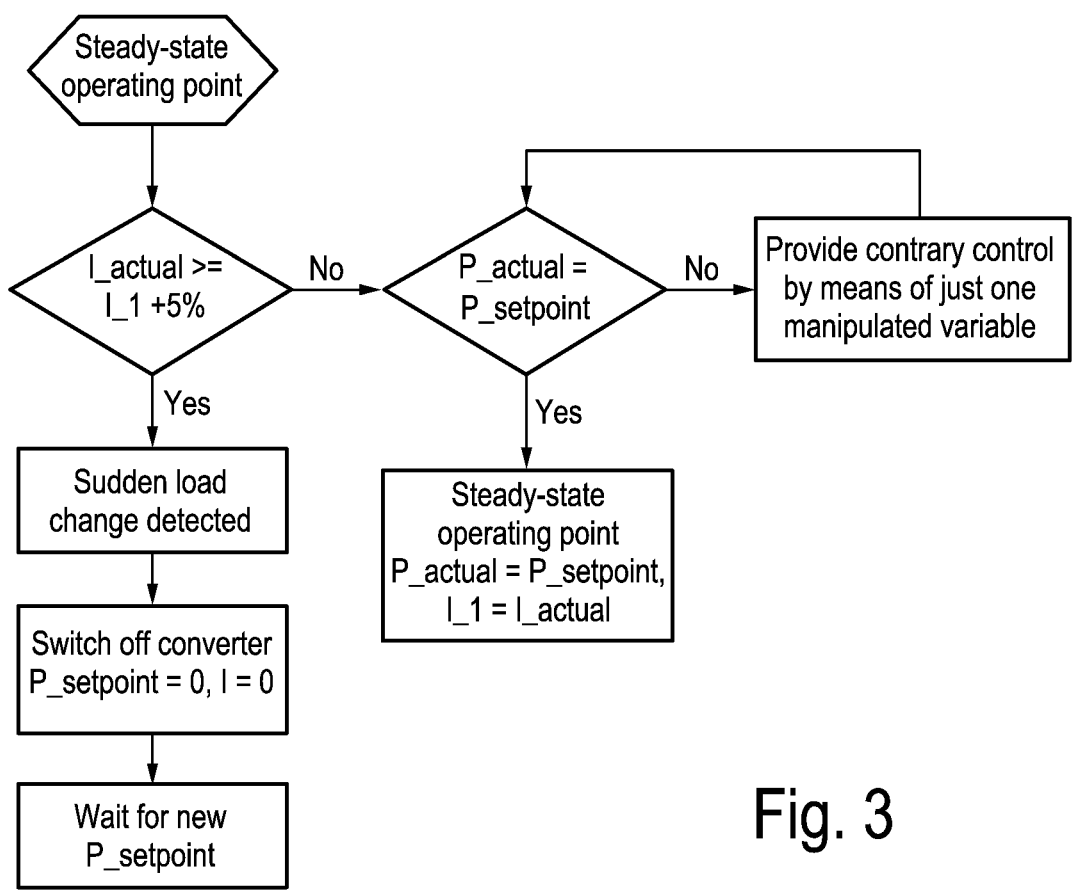

The flowchart in FIG. 3 depicts how the steady-state operating point is adjusted or corrected taking into consideration the dynamic current limiting described previously. Assuming a steady-state operating point like that described above, the actual current I_actual in the induction coil 14 now at once becomes larger. If it becomes less than 5% larger than the current I_1 flowing beforehand, or else if it does not change at all, then a check is performed to determine whether the measured secondary power P_actual still corresponds to the desired secondary power P_setpoint. It is possible, of course, that the desired power for the electrical consumer 30 has changed on account of small changes in electrical parameters, for example as a result of temperature effects. If the measured secondary power P_actual still corresponds to the desired secondary power P_setpoint, the operating point remains the same as before.

If the measured secondary power P_actual no longer corresponds to the desired secondary power P_setpoint, however, then just a single manipulated variable is used to provide contrary control, specifically until the measured secondary power P_actual corresponds to the desired secondary power P_setpoint again. The operating point is then reached again.

If the actual current I_actual in the induction coil 14 is now at least 5% more than the current I_1 flowing before-hand, however, then a sudden load change in the electrical consumer 30 is assumed, for example because a user has now selected a different power level or operating level for operation of the mixer, and information in this regard has possibly not reached the controller 23, however. The converter or the power generation 16 is then immediately switched off in order to switch off the current as fast as possible so that no additional energy is now supplied to the electrical consumer. The prescribing of a new desired secondary power P_setpoint is then awaited. When it has been received, it is thus then possible to target the operating point as per FIG. 2.

Figure 4:
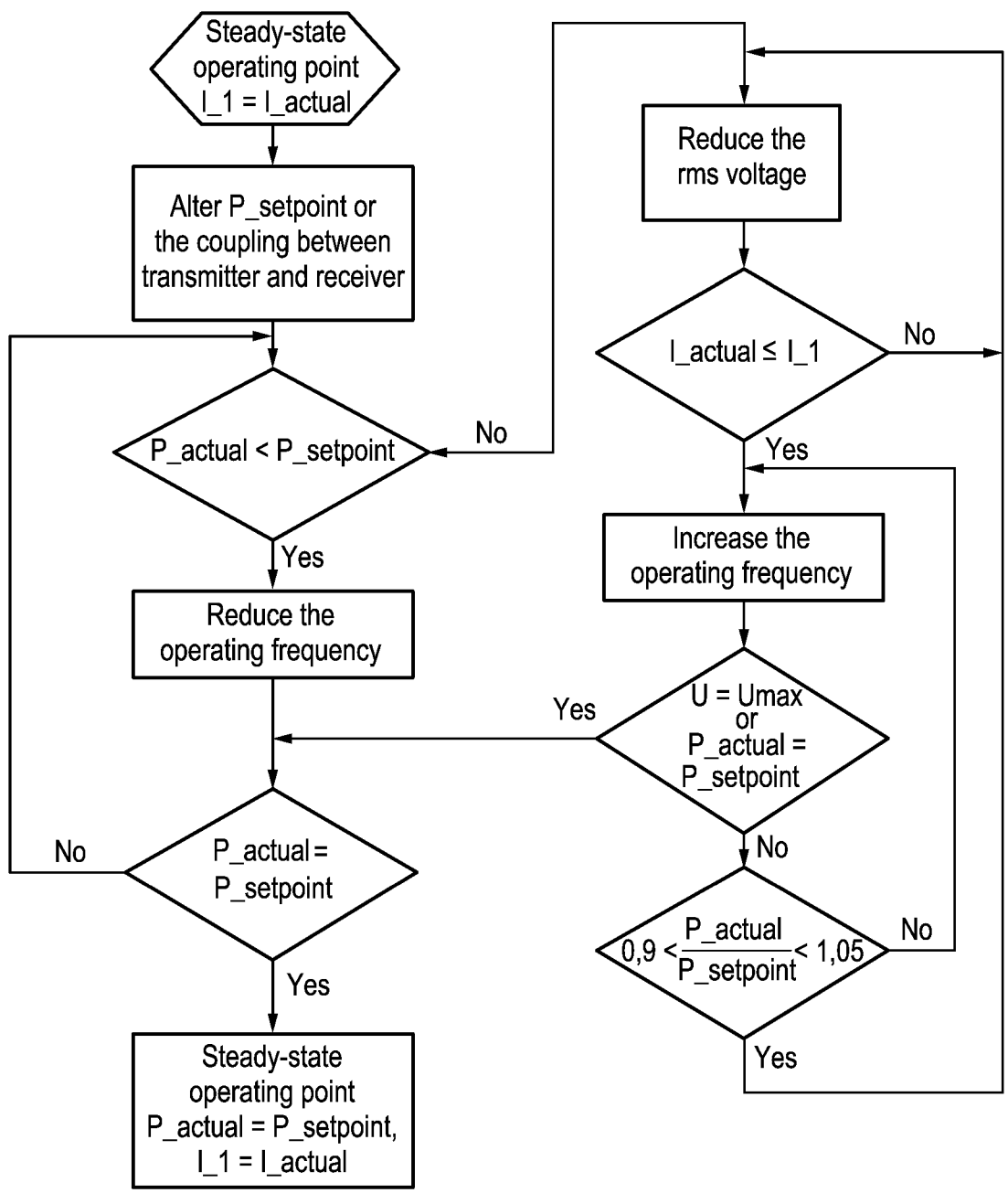
Figure 5:
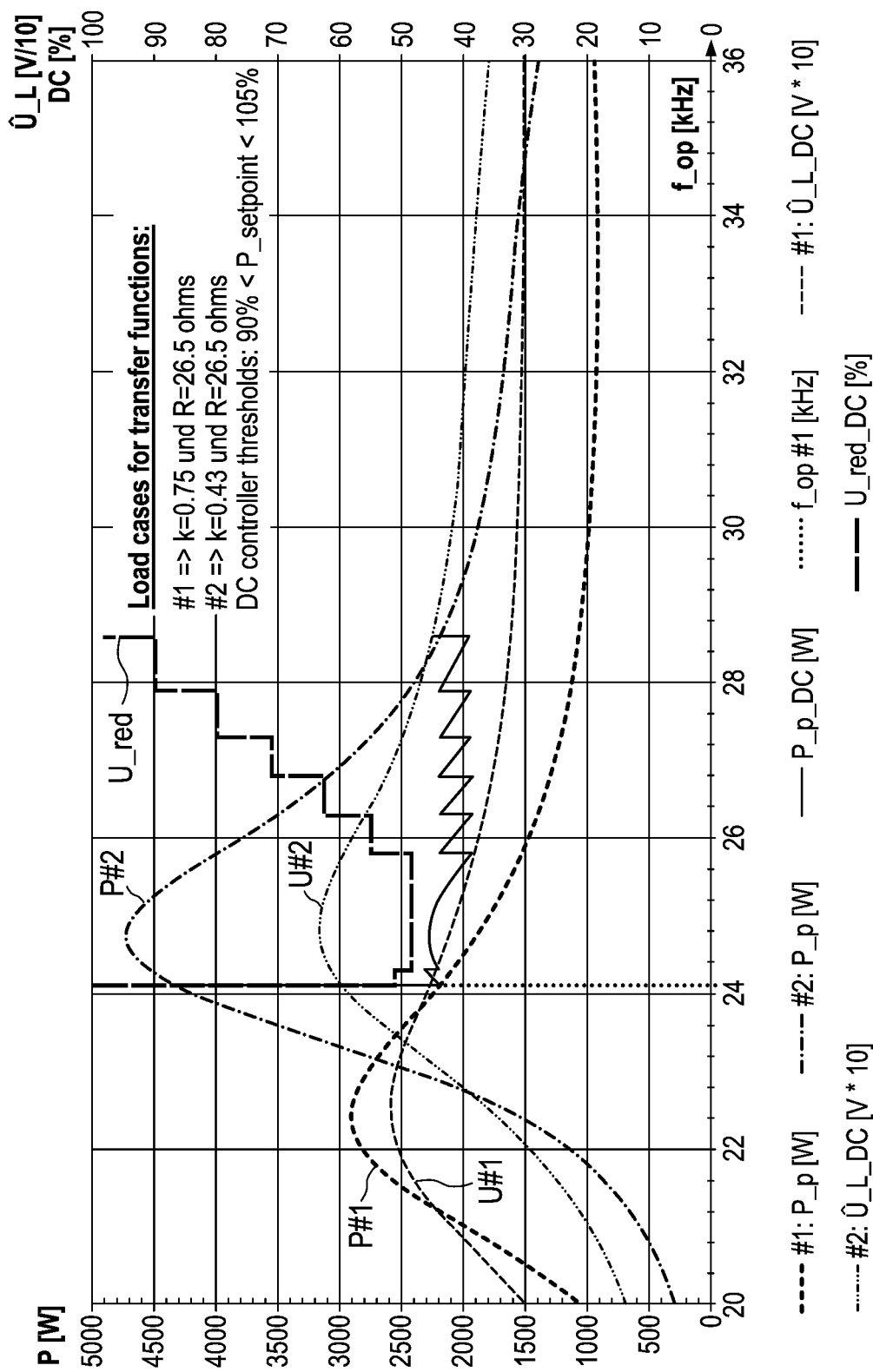
FIG. 5 shows a transfer function for power as a function of the frequency P(f), with control shown.

FIG. 4 in combination with FIG. 5 depicts how a transmission is made from a previous operating point to a new operating point. A steady-state operating point obtained as per FIG. 2 exists with a current I_actual through the induction coil 14 that corresponds to an existing current I_1. The power P_p #1 is 2200 W, and the coupling factor k is 0.75. This is supposed to correspond to relatively good coupling between the induction coil 14 and the electrical consumer 30 or receiver coil 39 in this case, advantageously as a concentric arrangement. Then, either the power requirement for the desired secondary power can change, for example sharply, or the transformer-style coupling changes as described previously on account of the electrical consumer 30 being moved relative to the induction coil 14, for example by between 3 cm and 5 cm.

A check is first of all performed to determine whether the measured primary power P_actual is lower than the desired power P_setpoint, which corresponds to the desired secondary power, that is to say whether the power on the electrical consumer 30 is supposed to become higher, for example because the desired power has been increased there by a user. If this is the case, then the operating frequency of the power generation 16 for the induction coil 14 is reduced. From FIG. 5, it can be seen how the primary power P rises on the curve P #1 as a result, because the operating point moves to the left on the transfer function P(f). This is checked, and the operating frequency is reduced until the measured secondary power P_actual corresponds to the desired power P_setpoint. A steady-state operating point has then been found again with this very power, the actually measured current I_actual flowing through the induction coil 14 and causing a corresponding primary power therein.

If the measured secondary power P_actual is not lower than the desired power P_setpoint, but rather more likely higher, then the search for a new operating point begins, but in accordance with the jagged curve in FIG. 5. First, the effective voltage on the induction coil 14 is reduced until the current I_actual through the induction coil 14 is no larger than the current I_1 that flows beforehand or even is smaller proportionately to a setpoint power reduction. The effective voltage applied to the induction coil 14 is then reduced once again in the power generation 16. The actual power P_actual is supposed to be reduced, of course, that is to say that a move to the right on the transfer function P(f) in FIG. 5 is desired. As a result of the reduction in the voltage, the power changes for a constant operating frequency, becoming lower.

If the current I_actual through the induction coil 14 is less than or equal to the current I_1 that flowed beforehand, the operating frequency f is increased as explained at the outset, for example between 0.2 kHz and 1 kHz or 2 kHz. If a maximum voltage U_max is reached or if the measured power P_actual corresponds to the desired power P_setpoint, the flowchart flows to the left and the new steady-state operating point explained above is attained. If this condition is not yet satisfied, a check is performed to determine whether a ratio of measured secondary power P_actual to desired power P_setpoint is in a specific bandwidth, indicated here by +5%/−10%. If this is not the case, there is a sharp change and the previously explained step of increasing the operating frequency needs to be performed again.

If the condition is satisfied, on the other hand, the loop returns right to the top to reduce the effective voltage. This results in the zigzag line from left to right in this case. If a power P_setpoint of 2200 W was originally desired for operating the electrical consumer 30 at an operating frequency of approximately 24.2 kHz, the new operating point with this secondary power is at an operating frequency of approximately 28.6 kHz.

As shown in FIG. 5, movement makes the transformer-style coupling worse, the coupling factor k now being only 0.43. The transfer function then changes from that of P #1 to that of P #2, that is to say is distinctly different from a local peak at a different and slightly higher operating frequency. At the first instant, the current and the primary power on the induction coil 14 would rise sharply for constant operating frequency f so as still to be able to generate the desired power, which is prevented in the power generation, since otherwise damage could occur, as described previously. The voltage is lowered sharply until the current and the power assume the previous values again and the desired power would actually be applied in accordance with the previous transfer function P #1, and the operating frequency is then increased somewhat, for example by 0.2 kHz, as a result of which the primary power initially rises again, since the left-hand or capacitive branch of the new transfer function P #2 is now being used. The increase in the operating frequency serves to improve efficiency above all. During the second increase in the operating frequency, the local peak is encountered and operation changes to the right-hand inductive range. An increase in the operating frequency therefore now causes a drop in the primary power and hence in the measured power. The aforementioned zigzag characteristic is thus implemented frequently enough until, after an increase in the voltage each time, which is depicted by a long-dashed line, after the operating frequency fop increases, that primary power P at which the desired power P_setpoint of 2200 W is present on the electrical consumer 30 is generated. In accordance with the transfer function P #2, this is the case for the specific primary power at an operating frequency of approximately 28.6 kHz.

Procedures and characteristics would be similar even if, instead of the transformer-style coupling as a result of movement, the desired secondary power on the electrical consumer changes, for example because a user selects a different power level for the mixer.

The invention claimed is:

1. Method for controlling an induction coil to adjust a power generation for a primary power on said induction coil, wherein:
said induction coil is designed for power transmission to an electrical consumer put onto a cover above said induction coil, said electrical consumer having a receiver coil and an electrical load connected to said receiver coil,
control means for said power generation are provided,
said induction coil forms a primary-side resonant circuit with a capacitance connected in series,
said induction coil and said receiver coil are coupled in a style of a transformer such that a current in said induction coil induces a voltage in said receiver coil that causes a flow of current and hence a generation of a secondary power in said load of said electrical consumer,
information pertaining to a desired secondary power on said load of said electrical consumer is prescribed for said control means of said induction coil,
said control means of said induction coil have at least two manipulated variables by means of which they alter said generated primary power, namely an altering of an operating frequency for said primary-side resonant circuit as a first manipulated variable and an altering of a voltage effectively applied to said primary-side resonant circuit as a second manipulated variable, the second manipulated variable being different than the first manipulated variable,
said control means of said induction coil operate with a transfer function P(f) that has at least one local peak and that, at least locally, is such that decreasing said operating frequency leads to said primary power being higher and increasing said operating frequency leads to said primary power being lower,
wherein
said control means in a first mode of operation always attempt to adjust a desired secondary power to a steady state using a maximum modulation of said voltage effectively applied to said primary-side resonant circuit, as the second manipulated variable, in the following cases:
in an event of a change in said desired secondary power or
in an event of a difference between a measured secondary power and said desired secondary power caused by a change in said transformer-style coupling between said induction coil and said receiver coil and/or by a change in said electrical load brought about by integrated switching means in said electrical consumer,
said primary power is increased by virtue of said control means decreasing said operating frequency as said first manipulated variable,
said primary power is decreased by virtue of two distinct steps, wherein said voltage effectively applied to said primary-side resonant circuit, as said second manipulated variable, is decreased in a first of the two distinct steps and said operating frequency as said first manipulated variable is increased in a second of the two distinct steps, the second step being subsequent to the first step.

2. Method according to claim 1, wherein:
if said electrical consumer is moved and, as a result, said transformer-style coupling becomes lower and said primary-side resonant circuit is damped in a short time, said control means keep said primary-side current approximately constant at an initial level of said primary-side current of I_1 before said electrical consumer was moved, with a range of variation of ±5%, at constant operating frequency in a first step, wherein this is accomplished by reducing said voltage effectively applied to said primary-side resonant circuit, as said second manipulated variable, wherein this results in said secondary power being generated being lower than said desired secondary power,
said operating frequency as said first manipulated variable is then increased in a second step until said current in said induction coil has changed by no more than ±10% or said primary power differs from a value for said primary power at which said secondary power corresponds to said desired secondary power by no more than ±10%, said voltage effectively applied to said primary-side resonant circuit, as the second manipulated variable, is subsequently altered again such that said primary-side current has again reached its initial level of I_1 before said electrical consumer was moved or said desired secondary power has been obtained, said first aforementioned step and said second aforementioned step are then performed alternately until said measured secondary power is less than or equal to said desired secondary power or until a maximum possible voltage effectively applied to said primary-side resonant circuit, as said second manipulated variable, is reached.

3. Method according to claim 2, wherein permanent operation of said induction coil to supply power to said electrical consumer is effected at an operating frequency at which a curve of the transfer function P(f) has a negative first derivative over said operating frequency.

4. Method according to claim 1, wherein in said second step, when said operating frequency as said first manipulated variable is increased, a threshold for a change in said current in said induction coil or a threshold for a change in said primary power upward is lower than downward.

5. Method according to claim 1, wherein information pertaining to a desired secondary power on said load of said electrical consumer is prescribed for said control means.

6. Method according to claim 5, wherein said electrical consumer sends said prescribed value for said power generation to said power generation.

7. Method according to claim 1, wherein said power transmission is permanently effected at said maximum possible voltage effectively applied to said primary-side resonant circuit, as said second manipulated variable, wherein an effective voltage of maximum magnitude is applied to said induction coil at an arising operating frequency as said first manipulated variable.

8. Method according to claim 1, wherein said increasing of said operating frequency is stopped each time as soon as a resulting change in said primary power reaches a threshold of +/−10%.

9. Method according to claim 1, wherein multiple induction coils in an induction hob are controlled using said method, wherein an operating frequency to increase said primary power of one of said induction coils is not reduced continuously but is reduced in steps or stages.

10. Method according to claim 9, wherein a change in said operating frequency of one said induction coils is synchronized together with those changes of said operating frequency of other said induction coils.

11. Method according to claim 1, wherein an operating frequency is used that is above said operating frequency at which said transfer function P(f) has its local peak.

12. Induction coil apparatus having at least one induction coil designed for power transmission to an electrical consumer put onto a cover above said induction coil, which electrical consumer has a receiver coil and an electrical load connected thereto, wherein said induction coil apparatus:
   has control means for a power generation for a primary power on said induction coil,
   has a capacitance that is connected in series with said induction coil and forms a primary-side resonant circuit,
   has a controller designed to perform the method according to claim 1, wherein:

said induction coil and said receiver coil are coupled in the style of a transformer such that a current in said induction coil induces a voltage in said receiver coil that causes a flow of current and hence a generation of a secondary power in said load of said electrical consumer, said control means of said induction coil have at least two manipulated variables by means of which they alter said generated primary power, namely an altering of an operating frequency for said primary-side resonant circuit as a first manipulated variable and an altering of a voltage effectively applied to said primary-side resonant circuit as a second manipulated variable, said control means of said induction coil are designed such that they operate with a transfer function P(f) that has at least one local peak and that, at least locally, is such that decreasing said operating frequency leads to a higher primary power and increasing said operating frequency leads to a lower primary power.

13. Method for controlling an induction coil, in particular on an induction hob, to adjust a power generation for a primary power on said induction coil, wherein:

said induction coil is designed for power transmission to an electrical consumer put onto a cover above said induction coil, which electrical consumer has a receiver coil and an electrical load connected thereto, control means for said power generation are provided, said induction coil forms a primary-side resonant circuit with a capacitance connected in series, said induction coil and said receiver coil are coupled in a style of a transformer such that a current in said induction coil induces a voltage in said receiver coil that causes a flow of current and hence a generation of said secondary power in said load of said electrical consumer, information pertaining to a desired secondary power on said load of said electrical consumer is prescribed for said control means of said induction coil, said control means of said induction coil have at least two manipulated variables by means of which they alter said generated primary power, namely an altering of an operating frequency for said primary-side resonant circuit as a first manipulated variable and an altering of a voltage effectively applied to said primary-side resonant circuit as a second manipulated variable, the second manipulated variable being different than the first manipulated variable, said control means of said induction coil operate with a transfer function P(f) that has at least one local peak and that, at least locally, is such that decreasing said operating frequency leads to a higher primary power and increasing said operating frequency leads to a lower primary power, wherein dynamic limiting of a current through said induction coil is effected, a limit is +10% of a present current value, wherein said limit must not be exceeded for a period of more than 1 sec, and otherwise said power generation on said induction coil is switched off or said current is reduced to a value at least 50% below said present current value, said current is reduced by virtue of two distinct steps, a first of the two distinct steps involving said voltage effectively applied to said primary-side resonant circuit, as said second manipulated variable, being reduced, and a second of the two distinct steps, subsequent to the first, involving said operating frequency being increased, as said first manipulated variable.

14. Method according to claim 13, wherein said limit is regularly corrected every 8 msec to 500 msec.

15. Method according to claim 13, wherein said current through said induction coil is measured by a comparator that directly influence a driver for power semiconductors as control means for said induction coil.

16. Method according to claim 13, wherein a power generation with a half-bridge circuit for said induction coil involves a current peak being measured as current, which current peak is generated by precisely one power switch of said half-bridge circuit, said power switch having a shorter ON time in comparison with another power switch of said half-bridge circuit.

* * * * *